United States Patent Office 2,786,144
Patented Mar. 19, 1957

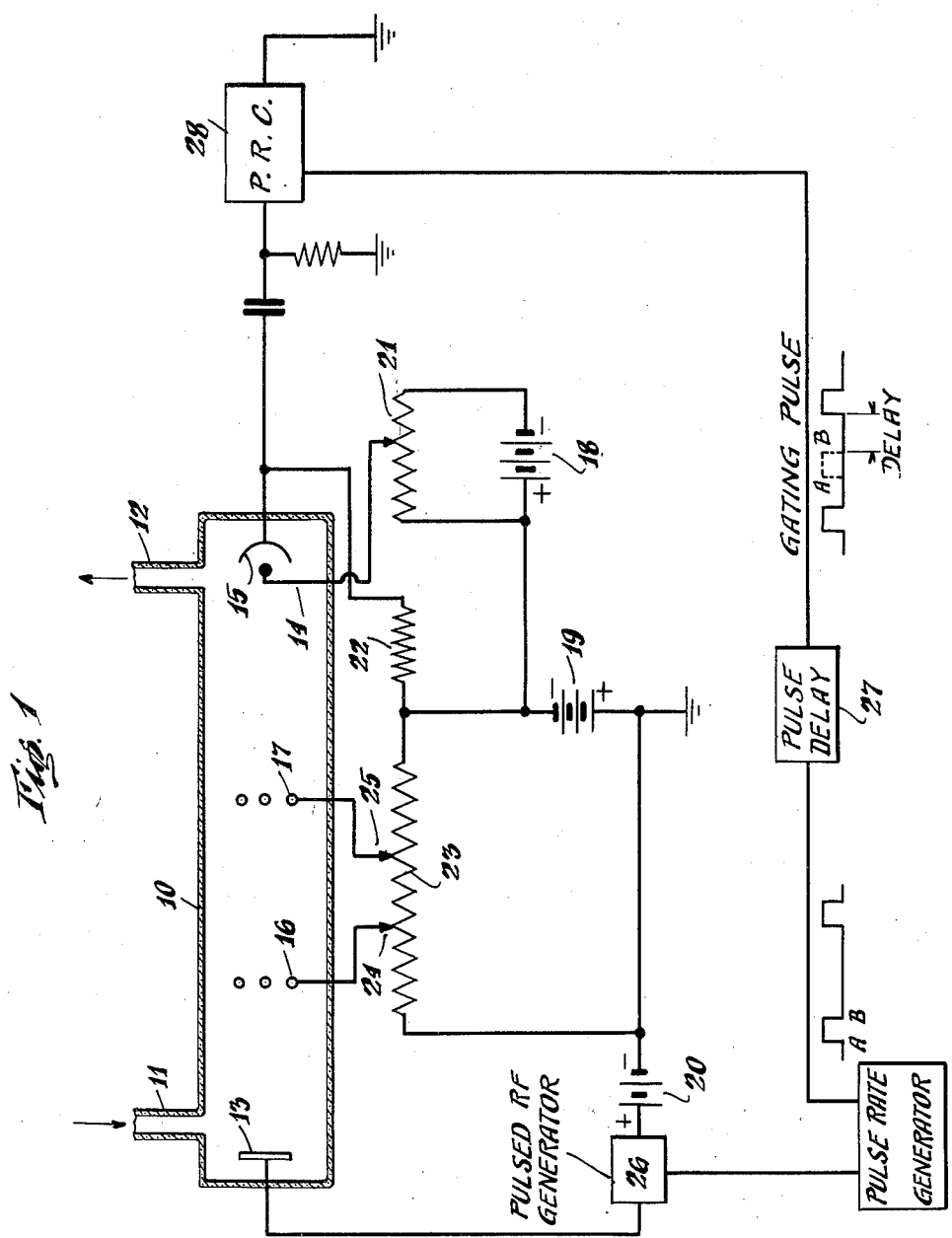

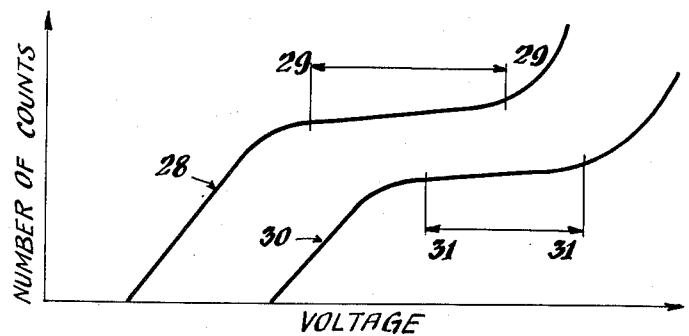

2,786,144

METHOD FOR DETECTING HYDROCARBONS IN SOIL GASES

Paul B. Weisz, Pitman, N. J., assignor to Socony Mobil Oil Company, Inc., a corporation of New York Application December 12, 1951, Serial No. 261,347

1 Claim. (Cl. 250—43.5)

This invention has to do with method and means for detecting polyatomic materials, and particularly hydrocarbons in gas samples.

One field in which means for the detection of polyatomic gases, particularly hydrocarbons, in small amounts, is desirable is in the analysis of soil gases for petroleum finding.

There have been many proposals for collecting and analyzing a series of gas samples collected from the soil at points distributed across the area under investigation, noting whether or not hydrocarbons were present and attempting, from the pattern, if there be one, of hydrocarbon concentration, to deduce concerning possible underlying petroleum deposits.

While many techniques have been developed for the gathering of such samples, the method, in general, has failed because of the lack of analytical techniques capable of measuring with any degree of accuracy the extremely small proportions of hydrocarbons present.

This invention has for its principal object the provision of a method for detection of minute concentrations of hydrocarbons and the provision of an apparatus, embodying that method, capable of ready portability, simple, and relatively rugged.

This invention is based upon certain phenomena in the ionization of gases by electrical discharges and the fact that ions upon collision with polyatomic materials, such as hydrocarbons, lose their charge to the latter.

The invention may be understood by reference to the drawings which are attached to and made a part of this specification.

In these drawings, Figure 1 is a showing, highly diagrammatic, of a detector tube and associated wiring for carrying out this invention. Figure 2 shows results which may be obtained by operation of this set-up, and Figure 3 shows certain data concerning ionization potentials.

Turning now to Figure 1, 10 is a gas analysis tube, which may be of glass, equipped with gas inlet 11 and gas outlet 12. At one end of tube 10 there is mounted an electrode 13 and at the other end are electrodes 14 and 15, with one or more grids 16 and 17 mounted therebetween. Now if an electrical system is devised wherein items 16, 17, 14, 15 are progressively more negative to 13, and the voltage differential across 13 to 15 is sufficiently great, if the gaseous contents of tube 10 contains ions those ions will be accelerated toward electrode 15. Such a system is shown, schematically, comprising voltage sources 18, 19, 20, variable resistor 21, resistance 22, resistance 23 tapped variably at 24 for grid 16 and at 25 for grid 17, and pulsed R. F. generator 26, for a purpose hereinafter explained.

It will be noted by those skilled in the art that electrodes 14 and 15, together with circuit elements 18, 21, and 22, constitute a Geiger-Muller tube of known kind.

It will also be noted that the distribution of potential along the tube from 13 to 15 is such that ions when produced, will migrate in the direction 13 to 15, impelled thereto by the grids 16, 17, of which there may be one or a plurality.

The pulsed R. F. generator 26 serves to periodically place a sufficient potential across the tube to bring about ionization therein, after which the ions, migrating to the area 14—15 cause "counting" in the Geiger-Muller tube portion of the set up. This pulse generator system may be a spark type, or more usually a gated or pulsed radio frequency generator of conventional type. It is also convenient to use, in connection with this pulse generation system a pulse delay, indicated at 27, to give rise to a gating pulse, which gating pulse is utilized to so control the operation of a conventional pulse rate counter 28, so that the counter operates during the interval in which the migrating ions, produced by each pulse of 26, are arriving.

Some electrical characteristics of the set up will now be noted. The gas analysis tube 10 may be operated at any internal pressure in the range say from about 3 mm. mercury absolute to about 10 atmosphere. It preferably will be operated at about 20 mm. mercury absolute. The electrical characteristics for operation at 20 mm. are about as follows: voltage source 18, 2000 volts; voltage source 19, 300 volts; voltage source 20, 100 volts; resistance 21, about 3 to 5 megohms; resistance 22, $10^8$ megohms, or greater (the GM tube section should be non-self quenching); resistance 23 of sufficient size and divisibility to give about 100 volts potential drop between each of the terminal-grid-grid-terminal steps used in the analyzer, remembering that one or several such grids may be used.

Now if the analyzer tube be supplied with an atmosphere of, say 90% argon and 10% air (by volume), and the analyzer tube operated, the response of the counter, as the potential across the counter electrodes is raised by manipulation of resistance 21 will show the usual "plateau" characteristic of the GM tube operation, as shown by curve 28, portion 29—29, in Figure 2. Such an operation may be used to determine the base characteristic of the analyzer.

Next the 10% air 90% argon mixture can be removed, and a mixture of 10% soil gas sample and 90% argon introduced to flow through the analyzer tube. The soil gas sample may contain, conceivably, in addition to the usual oxygen, nitrogen, content of air such things as carbon dioxide, carbon monoxide, water vapor, methane, ethane, and possibly some hydrocarbons of carbon number greater than 2. As a result of the operation of the analyzer tube, there will be positive ions travelling through such an atmosphere toward the metal surface of electrode 15.

When a positive ion travels toward a metal surface, it is, at a small distance of approach neutralized by extracting an electron from that metal to form an electrically neutral molecule. The "work-function" characterizes the energy required to draw such an electron out of a metal. Such work-functions have the order of magnitude of 3.0 to 4.0 e. v. for the usual metals employed as electrodes in electronic devices. However, the potential energy which the ion has above a normal neutral molecule is characterized by the ionization potential, and ionization potentials for gases range from about 9.0 to about 20.0 e. v. When some of this energy is utilized in drawing the electron from the metal, an excess energy of the order of the ionization potential less the work-function still remains associated with the now electrically neutral molecule. It is becoming increasingly well known that there are various ways in which this excess energy is expended, and it is known that:

1. Mono- and di-atomic molecules such as nitrogen, oxygen, argon, etc., will upon neutralization prefer to use their excess energy to draw at least one more electron out of the surface of the metal, resulting in such free electrons entering the gas space of the otherwise now neutralized gas molecules.

2. Molecules having many atoms such as hydrocarbon molecules will prefer to expend the excess energy by converting it into internal modes of vibration and rotation and by dissociating chemical bonds to form molecular fragments. In this action, no new electrical charges are introduced into the now neutralized gas space.

A further phenomenon which is utilized in this invention is the fact that in a mixture of ions and various molecules, the positive charge carried by the ion is ultimately transferred in collisions to the gas component having the lowest ionization potential.

Now this invention is based on the transfer of "ionization" so that in a mixture of gases all ions will, after elapse of sufficient time, be ions of the molecular species which has the lowest ionization potential; and the fact that if these ultimate ions are polyatomic such as hydrocarbons, they will be identifiable as such in that they will not extract electrons from a collecting electrode.

From this it may be seen that the gas analyzer tube, with its associated electrical systems, comprises 1, a source of positively charged ions, 2, a path through which the ions may pass for a sufficient length of time to permit a large probability of their contact with a polyatomic hydrocarbon ion if such be present, 3, a means or series of means for causing and controlling the passage of the positive ions along that path, and 4 a means for detecting and discriminating among these ions upon their arrival at the end of the path.

Turning again to Figure 2 as an example, when a hydrocarbon of carbon number greater than 2 is present in amounts capable of decreasing the number of positive ions arriving at electrode 15, the "count" of the GM counter will be lesser and show a "plateau" at a lower counting level than in the blank, as at curve 30, portion 31—31. The voltage variation is not significant, it is the number of counts per unit interval of time which is the significant variation.

It will be noted that this method offers something not present in many soil gas analysis methods. It can differentiate between methane and ethane. Methane is of little significance in soil gas analysis since it frequently arises from non-petroliferous sources. Ethane in soil gas seldom arises from non-petroliferous sources. This method is capable of effecting this differentiation because of the significant difference between the ionization potentials of $C_1$ and $C_2$ compounds, as shown in Figure 3.

From the data of Figure 3, it is obvious that methane being possessed of a higher ionization potential than $O_2$ will not give rise to a lessening of the count plateau as compared with a base count taken in the presence of 90% argon 10% air. Only the $C_2$ and $C_2$ plus hydrocarbons as shown below 12 e. v. in this figure are capable of giving this lower plateau count.

The method is capable of detecting small traces of hydrocarbons of the order of 1 part in $10^7$ and thereabouts. It may be increased in sensitivity by increasing the length of tube 10, or by increasing operating pressure, and hence increasing the opportunities for energy transferring contacts between the positive ions and the hydrocarbon ions. Other means leading to a similar result would increase residence time of ions in the gas before collection, as by variation in or temporary removal of the accelerating grid voltages, or by temporary application of an oscillating accelerating voltage. Appropriate circuit arrangements will be obvious to those skilled in the art. Also, any convenient method such as refrigeration, fractionation, selective absorption, and the like, may be used to produce an extract or concentrate of the soil gas sample which extract or concentrate may be used in the analysis, although in many cases the original sample may be used.

It is, of course, within the scope of this invention to utilize, for purposes of comparison, calibration, and basic data, synthetic "soil-gas" mixtures, and with such data, not only may $C_2$ and $C_2$ plus hydrocarbons be detected, but their amounts may be determined with reasonable accuracy.

I claim:

A method of geophysical prospecting that comprises the steps of selecting a mixture of gases, said mixture containing by volumetric proportions 90% argon and 10% air, producing ionization in said mixture accelerating toward a metallic target the positive ions thus formed through molecules of the gaseous mixture to effect a transfer of ionization to molecules of lower ionization potential, measuring the number of positive ions reaching said target by recording in the form of a voltage versus counts curve the counts produced by electrons extracted by the positive ions therefrom, collecting a sample of soil gas, mixing the sample of soil gas in volumetric proportions 10% soil gas with 90% argon, producing ionization in the mixture containing the soil gas, accelerating toward a metallic target the positive ions thus formed through molecules of the gaseous mixture to effect a transfer of ionization to molecules having lower ionization potentials, and after the elapse of a predetermined interval of time that is sufficiently long in duration that ions of the molecular species having only two or more carbon atoms remain measuring the quantity of hydrocarbon positive ions having at least two carbon atoms that reach the metallic target by producing a second voltage versus counts curve that will indicate the deficiency in counts occasioned by the presence of the hydrocarbon positive ions which have at least two carbon atoms that are in the vicinity of the target when the second curve is displayed on the same set of coordinates as the first.

References Cited in the file of this patent

UNITED STATES PATENTS

| | | |
|---|---|---|
| 1,421,720 | Roberts | July 4, 1922 |
| 2,112,845 | Howell | Apr. 5, 1938 |
| 2,485,469 | Allen et al. | Oct. 18, 1949 |
| 2,543,859 | Long | Mar. 6, 1951 |
| 2,551,544 | Nier et al. | May 1, 1951 |
| 2,582,216 | Koppius | Jan. 15, 1952 |